Patented Dec. 1, 1953

2,661,369

UNITED STATES PATENT OFFICE 2,661,369

DICYCLOHEXYL ETHANE COMPOUNDS AND A METHOD OF MAKING SAME

Erich M. H. Radde, New York, N. Y.

No Drawing. Application October 31, 1950, Serial No. 193,275

3 Claims. (Cl. 260—488)

This invention relates to dicyclohexyl ethane compounds, and more particularly to dicyclohexyl ethane compounds substituted by alkyl residues, and a method of producing the same.

One object of the present invention is to provide new chemical compounds of the following formula

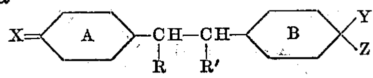

wherein R and R' are alkyl radicals, especially ethyl radicals, while X represents a keto or a secondary alcohol group or a group convertible by hydrolysis into said keto or secondary alcohol group, Y a side chain of the following formula —CX—$CH_2R''$ wherein X is a keto or a secondary alcohol group or a group convertible by hydrolysis into said keto or secondary alcohol group and R'' either hydrogen or a hydroxyl group or a group convertible by hydrolysis therein, and Z hydrogen or a hydroxyl group. The cyclohexyl nuclei A and B may be saturated but they may also contain a double bond.

Another object of this invention is to provide compounds of the formula

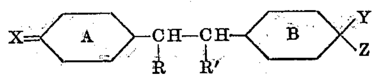

wherein X,R,R', and Z indicate the same groups as stated above and wherein rings A and/or B may contain double bonds, while Y represents a side chain substituent selected from the group of substituents consisting of —C≡CH and —CH=$CH_2$.

Still another object of this invention is to provide compounds of the formula

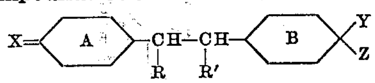

wherein X,R,R', and Z indicate the same groups as stated above and wherein rings A and/or B may contain double bonds, while Y represents a substituent selected from the group of substituents consisting of the COOH-group and groups convertible thereinto, such as its salts, its esters, halogenides, nitrile and the like.

A further object of this invention is to provide methods for producing said compounds by using compounds of the following formula as starting materials:

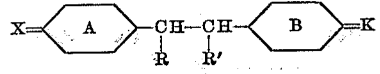

wherein X,R, and R' indicate the same groups as stated above and K is a keto group, while rings A and/or B may contain double bonds. Such starting materials are described, for instance, in French Patent 872,058 which relates to hydroxy ketones or diketones respectively of dicyclohexanedialkyl ethane compounds which are derived from the corresponding dialkyl stilbestrol compounds.

Other objects of this invention will be apparent from the specification and the claims attached thereto.

Compounds having the activity of the corpus luteum hormone are obtained for instance by converting a (p-acyloxy cyclohexanyl) (p-cyclohexanonyl) diethyl ethane, as they can be produced according to examples 8 or 10 of French Patent 872,058, into the corresponding cyanohydrin, splitting off water from the tertiary hydroxyl group and the neighbouring methylene group in said cyanohydrin, reacting the dehydronitrile with Grignard reagent so as to form the aceto cyclohexene compound, hydrogenating the double bond, oxidizing the hydroxyl group to the keto group, introducing bromine into the ketonic cyclohexane ring of the compound, and splitting off hydrogen bromide from said bromo compound. The resulting (cyclohexenonyl) (p-acetocyclohexanyl) diethyl ethane has the activity of the corpus luteum hormone.

The reaction described may be illustrated by the following formulas, wherein A and B represent saturated cyclohexane rings of the following structure

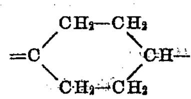

while A' and B' represent unsaturated cyclohexane rings of the following structures

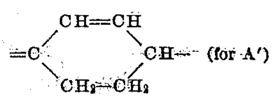

and

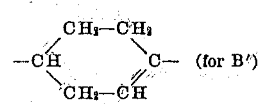

respectively:

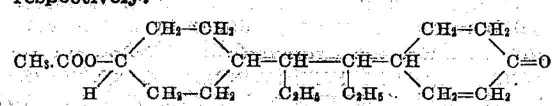

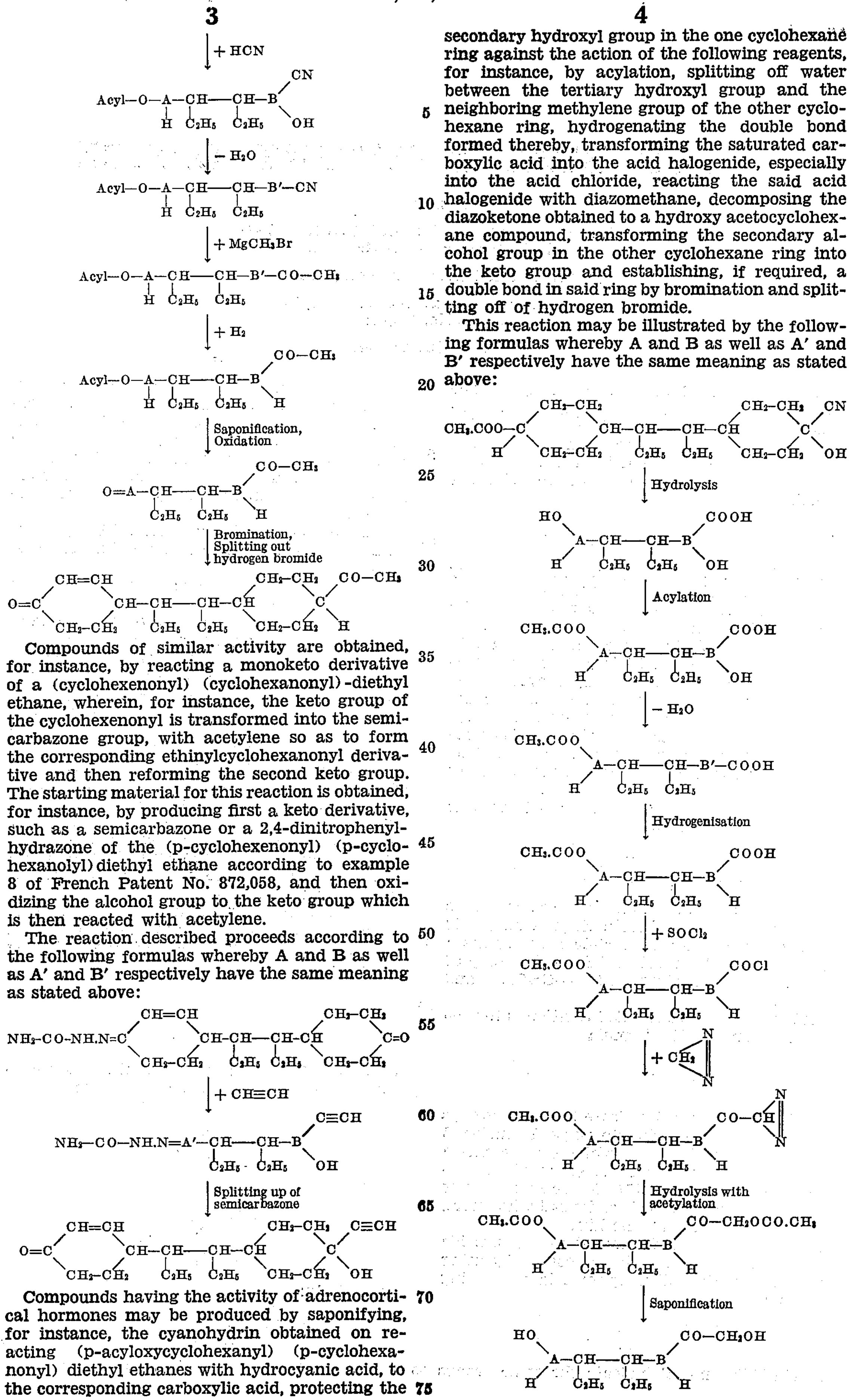

Compounds of similar activity are obtained, for instance, by reacting a monoketo derivative of a (cyclohexenonyl) (cyclohexanonyl)-diethyl ethane, wherein, for instance, the keto group of the cyclohexenonyl is transformed into the semicarbazone group, with acetylene so as to form the corresponding ethinylcyclohexanonyl derivative and then reforming the second keto group. The starting material for this reaction is obtained, for instance, by producing first a keto derivative, such as a semicarbazone or a 2,4-dinitrophenylhydrazone of the (p-cyclohexenonyl) (p-cyclohexanolyl) diethyl ethane according to example 8 of French Patent No. 872,058, and then oxidizing the alcohol group to the keto group which is then reacted with acetylene.

The reaction described proceeds according to the following formulas whereby A and B as well as A' and B' respectively have the same meaning as stated above:

Compounds having the activity of adrenocortical hormones may be produced by saponifying, for instance, the cyanohydrin obtained on reacting (p-acyloxycyclohexanyl) (p-cyclohexanonyl) diethyl ethanes with hydrocyanic acid, to the corresponding carboxylic acid, protecting the secondary hydroxyl group in the one cyclohexane ring against the action of the following reagents, for instance, by acylation, splitting off water between the tertiary hydroxyl group and the neighboring methylene group of the other cyclohexane ring, hydrogenating the double bond formed thereby, transforming the saturated carboxylic acid into the acid halogenide, especially into the acid chloride, reacting the said acid halogenide with diazomethane, decomposing the diazoketone obtained to a hydroxy acetocyclohexane compound, transforming the secondary alcohol group in the other cyclohexane ring into the keto group and establishing, if required, a double bond in said ring by bromination and splitting off of hydrogen bromide.

This reaction may be illustrated by the following formulas whereby A and B as well as A' and B' respectively have the same meaning as stated above:

Oxidation

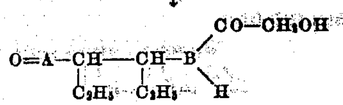

Bromination Splitting out of hydrogenbromide

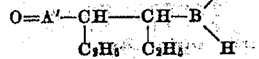

Acetylation

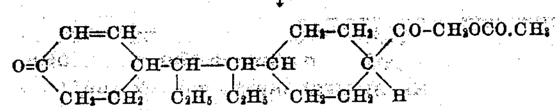

In order to produce said hydroxy acetocyclohexane compounds having adrenocortical hormone activity one may start with the (acetocyclohexanyl) (cyclohexanolyl) diethyl ethane compound described above which may be condensed with oxalic acid ester yielding the sodium salt of the oxalic ester condensation product which by saponification followed by decomposition with iodine in alkaline solution produces the iodoaceto cyclohexane compound. Said halogen compound is then transformed by reaction, for instance, with an acetate into the acetoxyaceto cyclohexane compound which by oxidation of the secondary alcohol group in the other cyclohexane ring, and by establishing a double bond in said ring, for instance, by bromination and splitting up of hydrogen bromide finally yields an (acyloxy acetocyclohexanyl) (cyclohexenonyl) diethyl ethane of an activity similar to that of an adrenocortical hormone.

The above mentioned reaction may be illustrated by the following formulas wherein A and B as well as A′ and B′ respectively have the same meaning as stated above:

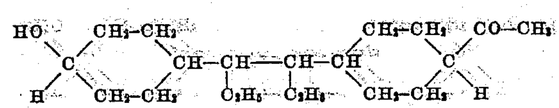

Condensation with oxalic acid ethyl ester

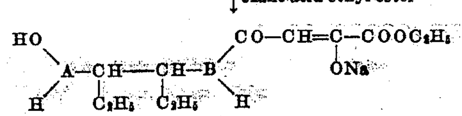

Saponification

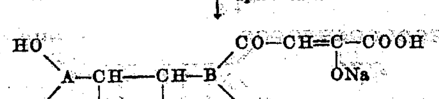

$+ I_2$ and KOH

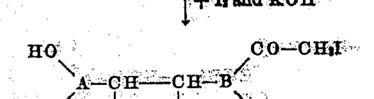

+ alkali acetate

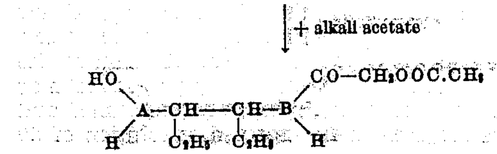

oxidation

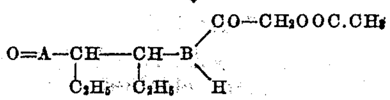

bromination splitting out of hydrogen bromide

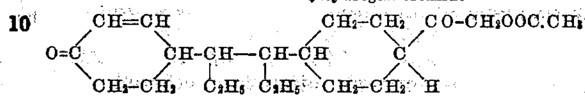

The same compound may also be obtained by reducing the (ethinyl cyclohexanolyl) (cyclohexanolyl) diethyl ethane described above in the presence of Rupe nickel catalyst to the corresponding vinyl compound. The secondary alcohol group in the other cyclohexane ring is then oxidized to a keto group, the vinyl ketone is reacted with osmium tetroxide to introduce two hydroxyl groups at the vinyl double bond. The triolone compound obtained is converted into its diacetate. By vacuum distillation with zinc dust one molecule of acetic acid is split off, thereby forming (acetoxyacetocyclohexanyl) (cyclohexanonyl) diethyl ethane which by bromination and splitting off of hydrogen bromide yields the corresponding cyclohexenonyl compound.

This reaction may be illustrated by the following formulas wherein A and B as well as A′ and B′ have the same meaning as stated above:

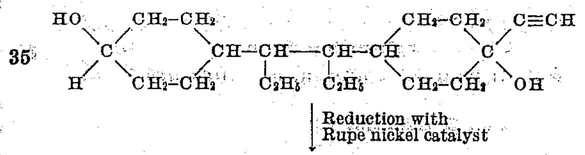

Reduction with Rupe nickel catalyst

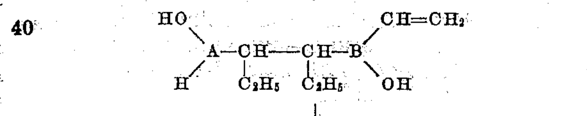

Oxidation

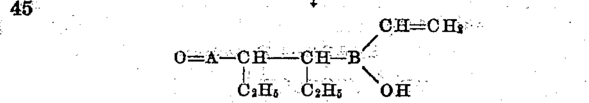

$+ OsO_4$

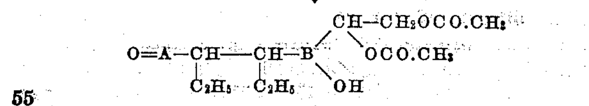

Distillation with Zn

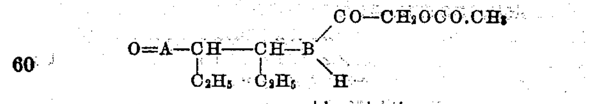

bromination splitting out of hydrogen bromide

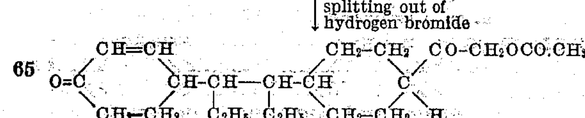

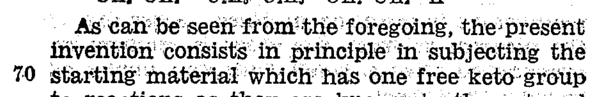

As can be seen from the foregoing, the present invention consists in principle in subjecting the starting material which has one free keto group to reactions as they are known to the art and especially in steroid hormone chemistry, whereby side chains are introduced into the molecule, said side chains corresponding in structure to the side chains present in said steroid hormones.

The following examples serve to illustrate the invention, without, however, limiting the same to them.

*Example 1*

25 g. of (p-acetoxy cyclohexanyl) (p-cyclohexanonyl) diethyl ethane obtained, for instance, according to French Patent 872,058, Examples 8 or 10, are heated with 100 g. of anhydrous hydrocyanic acid in an autoclave for about 4 hours at 50° C. Thereafter the unreacted hydrocyanic acid is evaporated and the cyanohydrin obtained is purified by recrystallisation from ethanol.

10 g. of said cyanohydrin are heated with 50 cc. of a solution of 3.0 g. sodium hydroxide in ethanol and 50 cc. of water in a sealed glass tube for 2 hours at 180° C., the reaction mixture is poured into water, acidified with dilute sulfuric acid, and the precipitated hydroxy carboxylic acid is separated.

10 g. of said acid are then allowed to stand at 20° C. with 40 cc. of dry pyridin and 40 cc. of acetic acid anhydride for 24 hours, the reaction mixture is poured in water, the precipitated monoacetate is washed with water, and is several times recrystallized from alcohol.

In order to split off water between the tertiary hydroxyl group and the neighboring methylene radical 5 g. of said monoacetate are heated under reflux with 25 cc. of pyridine and 2.5 g. of phosphorous oxychloride for half an hour, the reaction mixture is then poured into a mixture of ice and hydrochloric acid, the acid mixture is extracted with ether and the residue obtained is purified by crystallisation from aqueous acetone.

5 g. of said unsaturated acid are dissolved in 250 cc. of ethyl acetate and are then hydrogenated in a shaking apparatus with hydrogen in the presence of a palladium-calcium carbonate catalyst. After filtering off the catalyst the solvent is distilled off and the remaining saturated acid is purified by crystallisation from alcohol or any other suitable solvent.

5 g. of the saturated acid are boiled under reflux in 25 cc. of anhydrous benzene with 25 cc. of purest thionyl chloride for 3 hours, whereby care is taken that moisture is excluded. Thereafter the benzene as well as the excess of thionyl chloride are distilled off in a vacuum.

The remaining acid chloride is dissolved in 50 cc. of anhydrous ether and the solution is poured into 50 cc. of an anhydrous ethereal diazomethane solution containing 5 g. of freshly prepared diazomethane, said solution being cooled to −10° C. Within the next 2 hours the temperature is gradually raised to room temperature and the solution is allowed to stand over night. After filtration, the filtrate is evaporated almost to dryness in vacuo and the diazoketone formed is precipitated from its concentrated ethereal solution by the addition of petrol ether.

The precipitated diazoketone is then dissolved in 100 cc. of methanol and the solution mixed with 50 cc. of a 5% methanolic potassium hydroxide solution. The mixture is allowed to stand over night, water is added, the methanol is evaporated in vacuo, and the remaining saponified diazoketone is dissolved in ether. After drying the ethereal solution, the ether is removed by evaporation from a water bath and finally by vacuum distillation.

The diazoketone is then heated with 20 cc. of glacial acetic acid to 90° C., until no more nitrogen is developed. On cooling the corresponding hydroxy ketone is obtained.

2 g. of the same are allowed to stand over night with a solution of 1.5 g. of chromium trioxide in 95 cc. of glacial acetic acid and 5 cc. of water. The reaction mixture is poured into much water and is extracted several times with ether.

The (acetoxy acetocyclohexanyl) (cyclohexanonyl) diethyl ethane obtained after evaporation of the ether is then dissolved in 30 times its amount of chloroform.

To said solution a solution of bromine in chloroform is added drop by drop while stirring vigorously and cooling between −8° C. to −12° C. until 1 molecule of bromine has reacted to form the monobromo compound. The chloroform solution is washed with sodium bicarbonate solution and with water until neutral, is dried by means of sodium sulfate, and is subjected to vacuum distillation to remove the chloroform.

The residue is then boiled with 5 times its amount of dry pyridine for about 6 hours. The pyridine is distilled off in vacuum and the residue dissolved in ether. The ethereal solution is washed with dilute sulfuric acid, with sodium bicarbonate solution, and with water until neutral, and is dried with sodium sulfate. The ether is distilled off and the residue is purified by fractional distillation in a high vacuum. The (cyclohexenonyl) (acetoxyacetocyclohexanyl) diethyl ethane obtained has a corticosterone-like activity.

*Example 2*

20 g. of (p-acetoxycyclohexanyl) (p-cyclohexanonyl) diethyl ethane obtained according to French Patent No. 872,058, examples 8 or 10, are dissolved in 250 cc. of 96% ethyl alcohol. 40 g. of potassium cyanide and thereafter 50 g. of glacial aceticacid are added to said alcoholic solution while stirring. The reaction mixture is heated to boiling under reflux and is kept boiling for 2 hours, thereby stirring continuously. The solution is cooled to room temperature and is then poured into 500 cc. of chloroform. After addition of 1000 cc. of water the mixture is stirred and the chloroform extract separated from the aqueous solution. The latter is again extracted in the same manner twice with 200 cc. of chloroform and once with 150 cc. of chloroform. The chloroform extract is washed with water, 3% hydrochloric acid, and again acid-free with water and the chloroform is then distilled off in a vacuum. The cyanohydrin obtained may be further purified but it can be used as such for the next step.

44 g. of crude cyanohydrine are dissolved in 350 cc. of pure pyridine at room temperature. 35 cc. of pure phosphorus oxychloride are added to said solution and the reaction mixture is heated to boiling under reflux for about 4 hours. It is then cooled to room temperature, and poured upon a mixture of 1000 cc. of water containing about 400 g. of ice and 400 cc. of conc. hydrochloric acid while stirring vigorously. The dehydronitril precipitated is then dissolved in about 1000 cc. of acetone while stirring and heating under reflux. After filtering, the acetone is partly distilled off and then cooled until the dehydronitril precipitates. The precipitate may be purified by redissolving and recrystallisation from aqueous acetone.

Methylbromide is passed into 250 cc. of dry ether with 24 g. magnesium chips to which a few iodine crystals have been given. As soon as the absorption of methylbromide stops, i. e. as soon as about 125 g. of methylbromide are consumed and all the magnesium has reacted, a solution of 20 g. of dehydronitril in 200 cc. of anisol is run into said Grignard reagent solution. The reaction mixture is then heated for about 4–5 hours to about 60° C. while stirring, and is cooled to room temperature. It is thereafter added drop by drop, while stirring and cooling, to 1000 cc. of 50% acetic acid and then heated to remove part of the ether and anisol. The remainder is distilled off by steam distillation until all the anisol is removed. 400 cc. of hydrochloric acid 1:1 are then added and the acidified mixture is extracted several times with 200 cc. of chloroform each time. The combined chloroform extracts are washed with hydrochloric acid 1:1, with water, with 3% sodium hydroxide and again with water. The washed neutral chloroform extract is then evaporated to dryness. The dehydroacetohexahydrophenone obtained may be purified by recrystallisation from methanol.

13 g. of said dehydroacetohexahydrophenone are then hydrogenated in 650 cc. of methanol in the presence of 15 g. Raney nickel catalyst by passing hydrogen through said methanolic solution while shaking the reaction flask. As soon as the reduction of the double bond is completed, the methanol solution is separated from the catalyst which is washed with methanol and is kept under water until disposal. The methanol solution is then evaporated to dryness and the acetohexahydrophenone obtained recrystallized from acetone and if necessary purified over its semicarbazone. This is obtained by dissolving 10 g. of the crude product in 75 cc. of methanol while boiling under reflux. To the boiling solution there is added a solution of 6.5 g. of semicarbazide hydrochloride, and 10 g. of crystalline sodium acetate in 80 cc. of methanol and the boiling is continued for about 1 hour. After cooling the semicarbazone obtained is filtered off by suction and washed with methanol. The decomposition of said semicarbazone is carried out by heating the same in a mixture of 4 parts of methanol and 1 part of ether with 10 times its amount of 45% sulfuric acid for 1½ hours, pouring into water, filtering, and washing. The (p - hydroxycyclohexane) (p-acetocyclohexane)-diethyl ethane obtained may be further purified by recrystallization from acetone.

50 g. of said aceto cyclohexane compound are dissolved in 2000 cc. of dry toluene and are heated to boiling with 275 cc. of cyclohexanone. 22 g. aluminum isopropylate dissolved in about 100 cc. of toluene are then added thereto and the reaction mixture is kept boiling for about ½ hour. 125 cc. of water are added and the mixture is steam distilled in order to remove the toluene and the cyclohexanone and cyclohexanol. The aluminum hydroxide sludge is filtered off, washed with water and dried. It is then extracted, in a Soxhlet apparatus, with acetic acid ethyl ester. The extract is evaporated to dryness and the diketone obtained is recrystallized from acetic acid ethyl ester.

10 g. of said diketone are dissolved in 300 cc. of chloroform. To said solution a solution of bromine in chloroform is added drop by drop while stirring and cooling between about −5° C. to −10° C. until 1 molecule of bromine has reacted to form the monobromo compound. The chloroform solution is washed with sodium bicarbonate solution and with water until it is neutral, is dried by means of sodium sulfate, and the chloroform is then distilled off by vacuum distillation.

The crude bromo compound is boiled under reflux with 75 cc. of dry pyridine for about 6 hours. The pyridine is removed by vacuum distillation and the residue dissolved in ether. The ethereal solution is washed with dilute sulfuric acid, with sodium bicarbonate solution, and with water, and is dried with sodium sulfate. The residue remaining after evaporation of the ether, is distilled in a high vacuum or is purified by chromatographic absorption over aluminum oxide and elution by means of petrol ether or benzene or any other suitable solvent. A (cyclohexenone) (acetocyclohexane) diethyl ethane is obtained which has the activity of the corpus luteum hormone and can be further purified by means of its semicarbazone.

*Example 3*

Purified and dried acetylene is passed into 50 cc. of dry ether. To this solution there are added drop by drop a solution of 10 g. of potassium in 150 cc. of dry tertiary amyl alcohol, and a solution of 10 g. of (p-cyclohexenonyl-semicarbazone) (p-cyclohexanonyl) diethyl ethane obtained, for instance, from the semicarbazone of (p-cyclohexenonyl) (p - cyclohexanonyl) diethyl ethane according to Example 8 of French Patent No. 872,058, which is then oxidized to the monoketo derivative of the diketone, in 500 cc. of dry ether and 50 cc. of dry benzene, while stirring and introducing acetylene. Stirring and introduction of acetylene is continued for 5 hours. The reaction mixture is then acidified with saturated ammonium chloride solution containing hydrochloric acid and is extracted thoroughly with ether. The ethereal extract is washed, dried over sodium sulfate, and the solvents are distilled off by vacuum distillation, finally while passing a stream of carbon dioxide through the distilling apparatus. The distillation residue is purified by crystallisation from methanol or any other suitable solvent. The semicarbazone is split by reacting the crude product in 10 times its amount of dioxane and heating the mixture with 2 times its amount of 40% sulfuric acid for 1 hour at about 60° C. The reaction mixture is then diluted with about 4 times its volume of water while stirring and is allowed to stay over night whereby stirring is continued. The precipitate is filtered off, washed with water until no sulfate ions can be determined in the filtrate, and the (cyclohexenonyl)-(ethinylcyclohexanol) diethyl ethane is purified by recrystallization. This compound exhibits also corpus luteum hormone activity.

*Example 4*

A mixture of 16 g. of (cyclohexanolyl) (acetocyclohexanyl) diethyl ethane and 15 g. of oxalic acid ethyl ester is added to a solution of 1.5 g. of sodium in 150 cc. of absolute alcohol while stirring and heating. Heating is continued for about 5 hours and the reaction mixture allowed to stand over night. The condensation product obtained is filtered, dried, and heated for ½ hour with a solution of 2.0 g. of potassium hydroxide in 200 cc. of ethanol. The saponification mixture is poured into water and is extracted with ether to remove any non-acidic organic matter. The aqueous solution is treated with 100 g. of bisodium phosphate. To this solution there are added drop by drop a solution of 7 g. of iodine in 350 cc. of methanol and 6 g. of potassium hydroxide. After allowing the reaction mixture to stand over night the iodo compound is recovered therefrom. It is refluxed for 5 hours with 60 g. of potassium acetate in 1.2 liters of acetone. After filtering, the solvent is distilled off, the residue is extracted with ether, the ethereal extract is decolorized by shaking with sodium bisulfite solution and is dried by means of sodium sulfate. Thereafter the ether is evaporated and the residue recrystallized from acetone. By oxidation of the secondary alcohol group to the keto group by means of aluminum tertiary butylate in the presence of cyclohexanone in toluene and by establishing a double bond in the ketonic cyclohexane ring, preferably by bromination and splitting off hydrogen bromide, (acetoxy aceto cyclohexanyl) (cyclohexenonyl) diethyl ethane is obtained.

Of course, many changes and variations may be made by those skilled in the art in the reaction conditions, the reagents used, the methods of purifying the reaction products, and the like, in accordance with the principles set forth herein and in the claims annexed hereto. Thus, for instance, instead of the acetyl compounds, esters with other acids such as propionic acid, benzoic acid, phosphoric acid, stearic acid and others, or ethers, such as the methyl ether and others may be used as starting or intermediate compounds or may be produced as final products. The oxidation of the secondary alcohol group to the keto group may be carried out with other oxidizing agents instead of chromic acid, such as with permanganate, by the Meerwein-Ponndorf reaction and the like. The double bond in conjugation to the keto group may be introduced by other known means; for instance, splitting out of hydrogen bromide may be effected by means of dimethyl amiline, quinoline, and others. The addition of hydrocyanic acid or of acetylene to the cyclohexanone compound may be carried out in any other known manner. Acetylene, for instance, may be added in liquid ammonia solution. Splitting out water between the tertiary alcohol group and a neighboring methylene group in a cyclohexanolyl ring which contains a further substituent on the carbon atom carrying the tertiary alcohol group, may be effected by other means, as acetylchloride in acetic acid anhydride and others. Other catalysts than those mentioned, may be employed for hydrogenating the double bond produced on splitting out water between said tertiary hydroxyl group and the neighboring methylene group, for instance, platinum catalysts, or the hydrogenation may be carried out by chemical means. The ketonic intermediate and end products may be purified not only by fractional crystallisation from suitable solvents, but also by converting them into insoluble ketonic condensation products, for instance, with thiosemicarbazide, phenylhydrazine and others, besides those mentioned in the examples. The keto compound may be reformed from said ketonic derivatives not only by hydrolysis by means of acids and the like, but also by reacting said derivatives with other aldehydes or ketones, such as benzaldehyde and others.

What I claim is:

1. (p-Cyclohexenonyl) (p - hydroxyaceto cyclohexanyl) diethyl ethane of the following formula

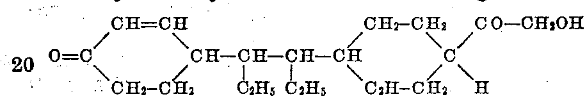

2. (p-Cyclohexenonyl) (p - acetoxyaceto cyclohexanyl) diethyl ethane of the following formula

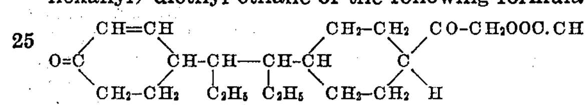

3. α(p-Cyclohexenonyl) - β - (p - hydroxy aceto cyclohexanyl)-diethyl ethane compounds of the following formula:

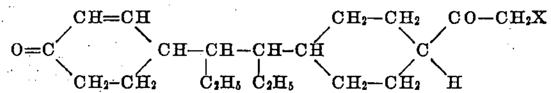

wherein X represents a member selected from the group consisting of a hydroxyl group and an acyloxy group.

ERICH M. H. RADDE.

References Cited in the file of this patent

UNITED STATES PATENTS

| Number | Name | Date |
|---|---|---|
| 2,392,864 | Schoeller et al. | Jan. 15, 1946 |
| 2,452,012 | Flory | Oct. 19, 1948 |

OTHER REFERENCES

Solmssen, Chem. Reviews, vol. 37, pp. 512–513 (1945).